(12) United States Patent
Yeung et al.

(10) Patent No.: US 7,650,531 B2
(45) Date of Patent: Jan. 19, 2010

(54) SYSTEM AND METHOD FOR AUTOMATICALLY RESTORING HARD DRIVES ON FAILURE

(75) Inventors: Cho S. Yeung, Flushing, NY (US); Souvik Choudhury, Farmingville, NY (US)

(73) Assignee: Computer Associates Think, Inc., Islandia, NY (US)

( * ) Notice: Subject to any disclaimer, the term of this patent is extended or adjusted under 35 U.S.C. 154(b) by 419 days.

(21) Appl. No.: 11/567,464

(22) Filed: Dec. 6, 2006

(65) Prior Publication Data

US 2007/0220308 A1 Sep. 20, 2007

Related U.S. Application Data

(60) Provisional application No. 60/742,825, filed on Dec. 6, 2005.

(51) Int. Cl.
*G06F 11/00* (2006.01)

(52) U.S. Cl. .................. 714/5; 714/2; 714/15; 714/42

(58) Field of Classification Search .............. 714/2, 714/5, 6, 7, 15, 42
See application file for complete search history.

(56) References Cited

U.S. PATENT DOCUMENTS

| | | | |
|---|---|---|---|
| 5,469,573 A * | 11/1995 | McGill et al. ............... 717/127 |
| 6,519,762 B1 * | 2/2003 | Colligan et al. ............. 717/170 |
| 6,532,535 B1 | 3/2003 | Maffezzoni et al. ............ 713/1 |
| 6,792,556 B1 * | 9/2004 | Dennis ........................... 714/6 |
| 6,862,681 B2 * | 3/2005 | Cheston et al. ................ 714/5 |
| 6,865,655 B1 * | 3/2005 | Andersen ....................... 714/6 |
| 7,401,249 B2 * | 7/2008 | Zhang ............................ 714/5 |
| 7,480,819 B1 * | 1/2009 | Mahmoud et al. ............. 714/6 |
| 7,506,198 B2 * | 3/2009 | Shoham ......................... 714/6 |
| 7,509,530 B2 * | 3/2009 | Welts .......................... 714/15 |
| 2003/0037279 A1 * | 2/2003 | Laio .............................. 714/6 |
| 2003/0084368 A1 * | 5/2003 | Sprunt et al. ................... 714/5 |
| 2003/0221095 A1 | 11/2003 | Gaunt et al. .................... 713/1 |
| 2003/0229819 A1 * | 12/2003 | Kodama ......................... 714/5 |
| 2004/0153733 A1 * | 8/2004 | Lin ................................ 714/6 |
| 2004/0210796 A1 | 10/2004 | Largman et al. ............. 714/20 |

* cited by examiner

*Primary Examiner*—Robert Beausoliel
*Assistant Examiner*—Joseph D Manoskey
(74) *Attorney, Agent, or Firm*—Pillsbury Winthrop Shaw Pittman LLP

(57) ABSTRACT

Systems and method for automatically restoring a hard drive after failure are provided. Disk recovery data may be collected and stored from an operational, online hard drive. When the hard drive subsequently fails, a client-specific recovery media may be generated, which may include a lightweight recovery environment. Restoration tasks may be completed automatically, thereby reducing an amount of user effort and/or expertise needed for restoration. Further, restoration tasks may be performed from a lightweight, client-specific disk recovery module, thereby eliminating processing overhead, such as that attributable to installing set up programs, rebooting a system during set up, or other overhead.

36 Claims, 9 Drawing Sheets

*FIG. 5E*
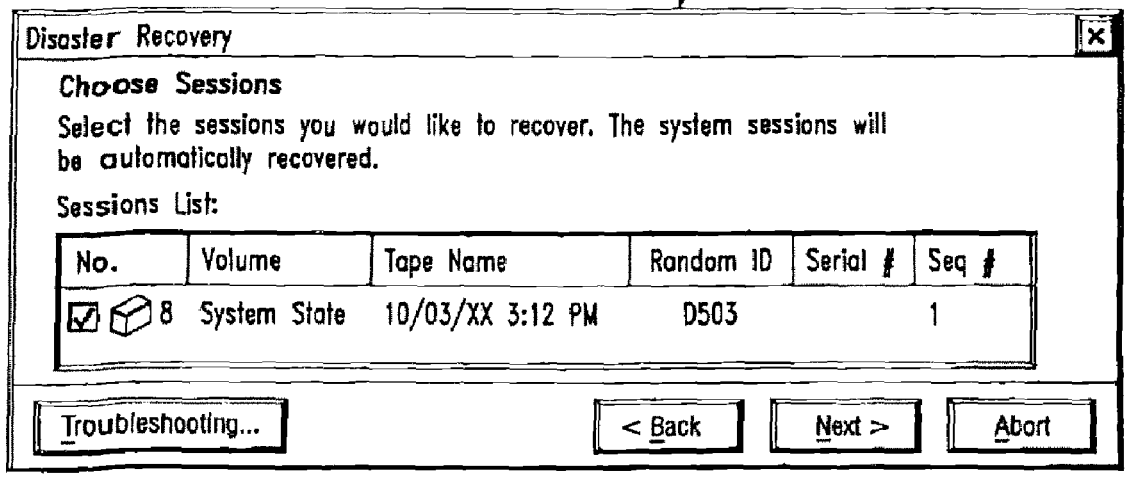
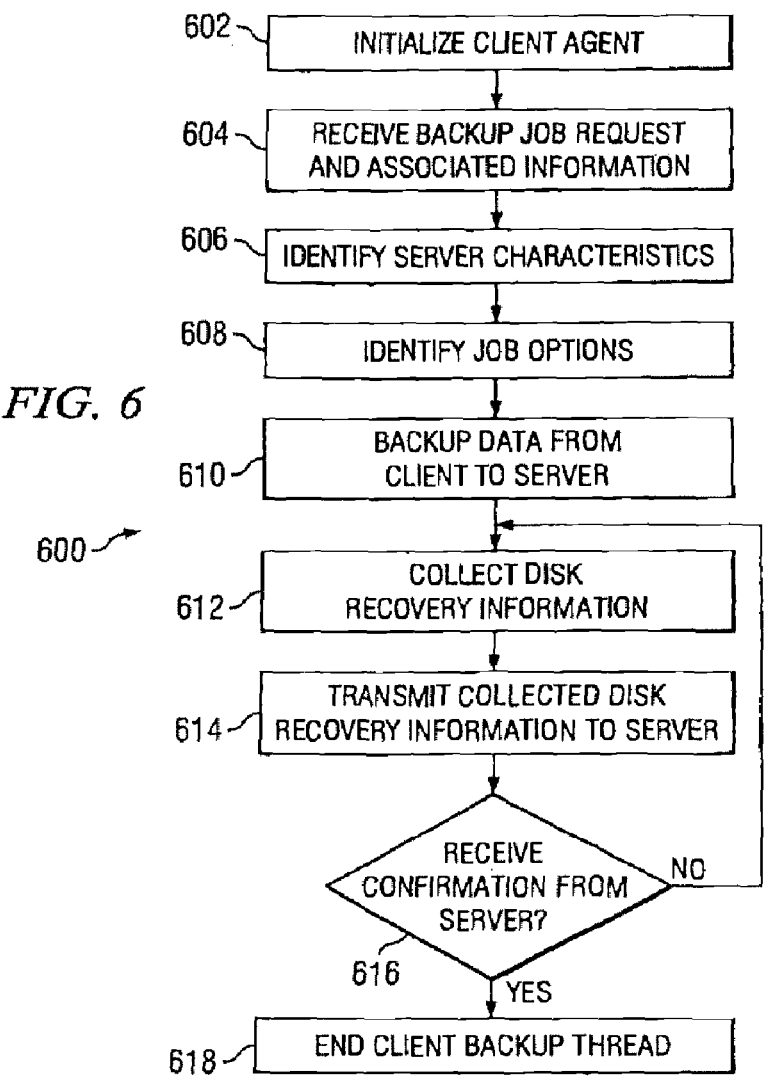
*FIG. 6*

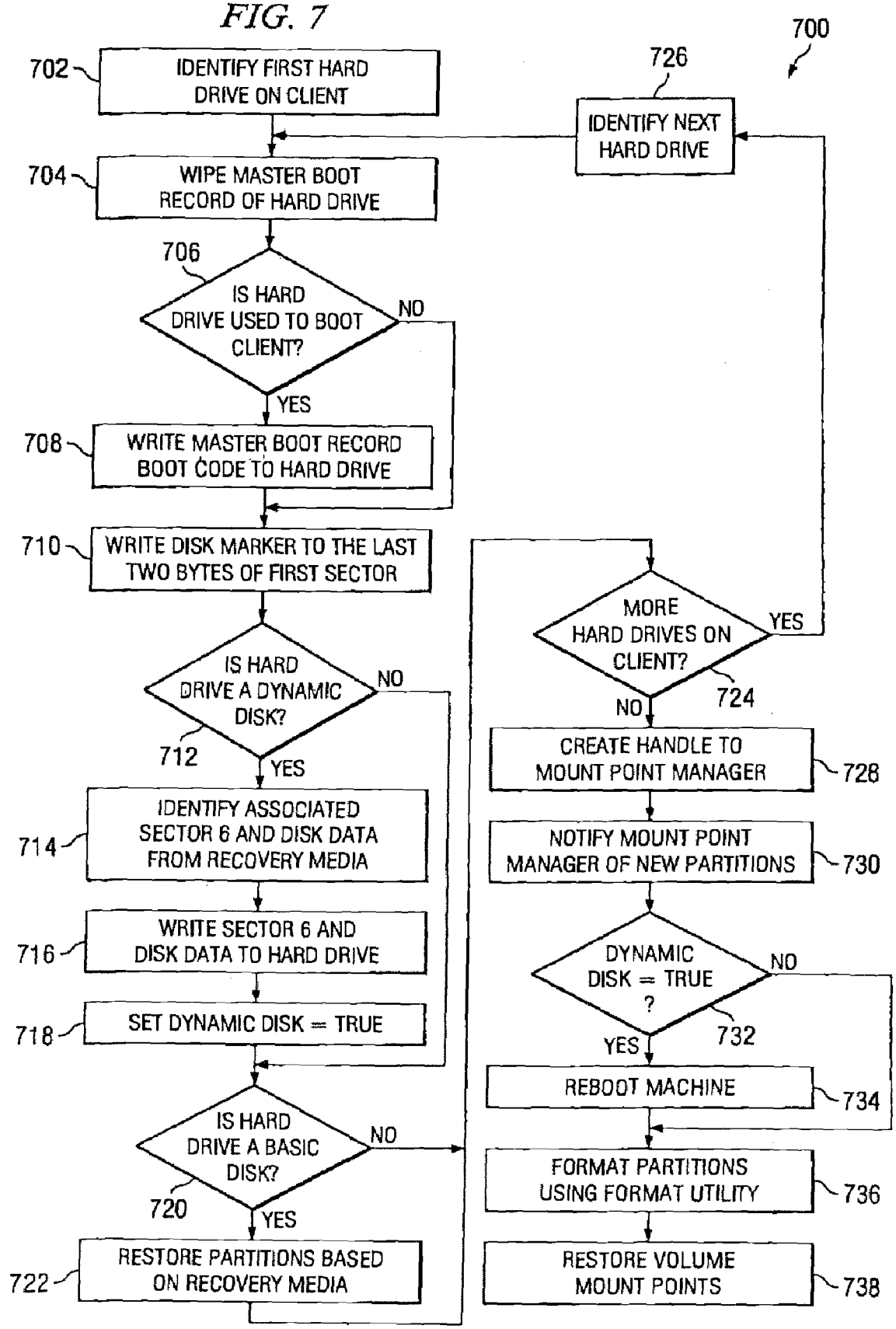

SYSTEM AND METHOD FOR AUTOMATICALLY RESTORING HARD DRIVES ON FAILURE

RELATED APPLICATIONS

This application claims the benefit of provisional U.S. Patent Application Ser. No. 60/742,825, entitled "System and Method for Automatically Restoring Hard Drives on Failure," filed Dec. 6, 2005, and which is hereby incorporated by reference in its entirety.

FIELD OF THE INVENTION

The invention relates to asset and network administration, and in particular, to a system and method for automatically restoring hard drives on failure.

BACKGROUND OF THE INVENTION

In nearly all computing environments, systems rely heavily on local hard drives, whether they be internal or external, that store one or more operating systems, applications, system data, user data, among other things. It is of critical importance to a well-functioning computing environment that such hard drives function properly, but the inevitable reality is that hard drives fail on occasion. For example, a computing device may cease to function properly when a hard drive becomes damaged (e.g., because of bad sectors, registry corruption, etc.). In the most severe cases, when a boot drive fails, the computing device may fail to boot up or start up altogether.

Accordingly, when recovering a failed hard drive, the first step involves setting up the drives to store data in the proper format. For example, setting up the drives may include partitioning the disks and establishing a valid file system on each partition. For instance, formatting a drive for Microsoft Windows may include partitioning the disks and formatting the drives in accordance with file systems such as FAT32 (File Allocation Table with 32-bit cluster numbers) and/or NTFS (New Technology File System). More particularly, before data can be restored at the file level, valid volumes and file systems are necessary to handle the disk input/output operations.

In existing systems, the process of performing and managing the process of setting up hard drives is quite time-consuming, in addition to requiring technical expertise. For example, a manual Windows set up generally requires anywhere from thirty minutes for Windows NT 4.0 to one hour for Windows 2000 and Windows XP ASR. Some existing systems automate various aspects of this process, which can reduce some of the technical expertise requirements, but these systems do little to reduce the time consumed by traditional set ups.

Therefore, existing systems are unable to provide rapid recovery of failed hard drives in a way that minimizes downtime and user intervention necessary for restoration. Existing systems suffer from these and other problems.

SUMMARY OF THE INVENTION

According to various aspects and implementations of the invention, a system and method for automatically restoring hard drives on failure may address these and other drawbacks of existing systems.

According to various aspects of the invention, a hard drive may be automatically restored after failure. Disk recovery data may be collected and stored from a hard drive of an operational, online client. For example, the disk recovery data may be stored to backup systems or data repositories. When the hard drive subsequently fails, a client-specific recovery media may be generated, which may include a footprint operating system (e.g., a recovery environment) and the collected disk recovery data. The footprint operating system may automatically restore a hard drive (e.g., by writing configuration information to the drive as raw data) without having to be installed on a hard drive. As such, restoration tasks may be completed automatically, thereby reducing an amount of user effort and/or expertise needed for restoration. Further, restoration tasks may be performed from a lightweight, client-specific disk recovery module, thereby eliminating a great deal of processing overhead, such as that attributable to installing set up programs, rebooting a system during set up, or other overhead.

According to various aspects of the invention, any suitable arrangement may be used to communicatively couple a server to one or more clients. The server may include a media generation component (e.g., a CD writer/rewriter), a recovery manager, and/or a data repository. The data repository may be a local or remote memory or storage device, which may store disk recovery data and/or backup data collected from a hard drive associated with a client.

According to various aspects of the invention, the disk recovery data may include various parameters and other information, at various levels of granularity, for restoring a hard drive to its original settings. For example, the disk recovery data may include information about a hard drive at a host level, at a disk level, at a partition level, and/or at a file system level. Further, the disk recovery data may include raw data from one or more predetermined disk regions. For example, RAID software simulation using dynamic disks may include storing raw data at predetermined disk regions, and as such, the disk recovery data may include such raw data. The backup data may include any files, data structures, application data, system data, or other information that a user may desire to restore to a hard drive after failure. For example, the backup data may include documents, spreadsheets, driver information, or any other suitable information that may be used to reinstall or recover a client state after hard drive failure. Accordingly, when a hard drive fails, the disk recovery data may be used, for example, to restore the failed hard drive to a previous operational state, while the backup data may be used, for example, to restore lost data that was stored on the hard drive before failure.

According to various aspects of the invention, a client may include an agent for sending disk recovery data and/or backup data associated with a hard drive to a server for backup. The disk recovery data and/or the backup data may be generated in various ways, such as while the hard drive is online and operational, during a backup process for selected nodes, upon a user request, or in other ways. The agent may simply and securely monitor, gather, or otherwise generate the disk recovery data and/or the backup data, and may further securely transmit the disk recovery data and/or the backup data to any suitable storage medium for subsequent recovery in an event of hard drive failure.

According to various aspects of the invention, when a hard drive fails, a recovery media may subsequently be generated (e.g., a bootable CD-ROM). The recovery media may include a footprint operating system (e.g., a recovery environment) and backed up disk recovery data and/or backup data. The generated recovery media may be loaded, installed, or otherwise used to restore a client to a pre-failure state of the failed hard drive. The recovery environment included on the recovery media may be a fully bootable environment, without having any reliance on a hard drive. The recovery environment may be a stripped down version of a conventional operating system, and may reside entirely on a bootable media (e.g., a CD-ROM). Further, the recovery environment can be loaded and run from memory (e.g., RAM) of a client. This feature may eliminate a need to install an intermediate operating system onto a hard drive being recovered, thereby providing a faster recovery path. The recovery environment may also eliminate reboots entirely during a restore process for a basic disk, or in the case of a dynamic disk, reduce a number of reboots to one. In some implementations, the recovery environment may natively support creating, modifying, and otherwise formatting hard disk partitions, thereby ensuring maximum compatibilities with various operating systems. Furthermore, the recovery environment may include driver supports and application program interfaces associated with various operating systems.

Other objects and advantages of the invention will be apparent based on the following drawings and detailed description.

BRIEF DESCRIPTION OF THE DRAWINGS

FIGS. 5a-e illustrate exemplary graphical user interfaces for restoring a failed hard drive according to various aspects of the invention.

FIG. 6 illustrates an exemplary process for collecting client information according to various aspects of the invention.

FIG. 7 illustrates an exemplary process for restoring a failed hard drive according to various aspects of the invention.

DETAILED DESCRIPTION

Figure 1A:
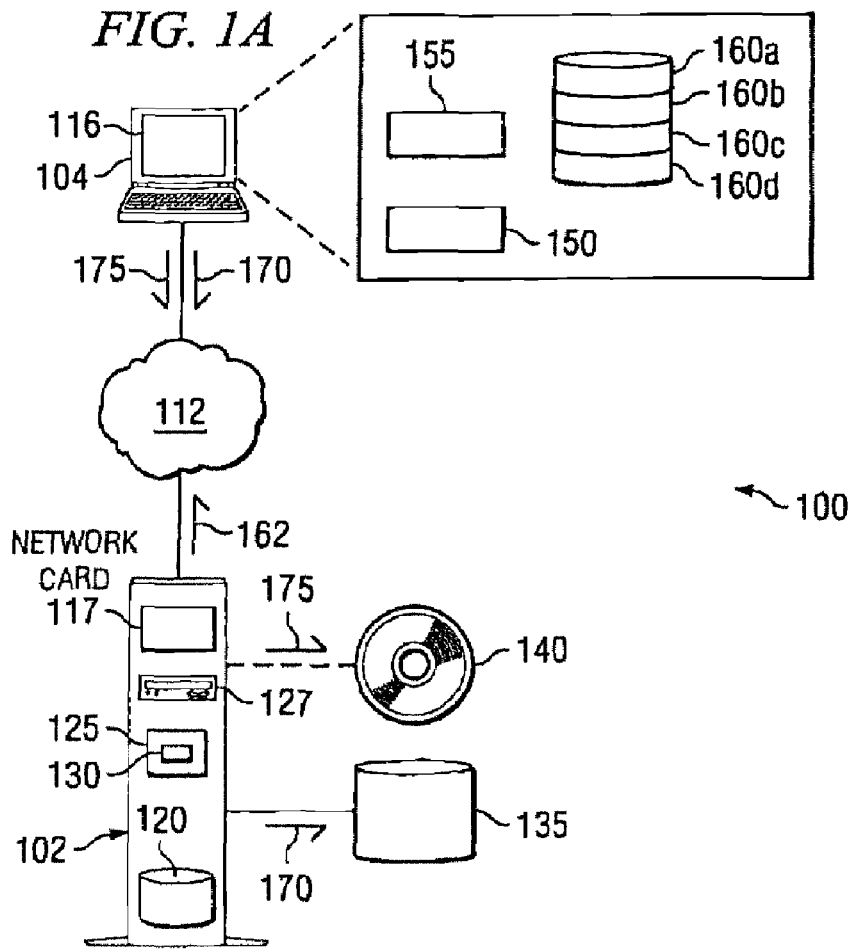
FIGS. 1a-d illustrate exemplary systems for automatically restoring hard drives on failure according to various aspects of the invention.

Referring to FIG. 1a, an exemplary system 100 for automatically restoring hard drives on failure is illustrated according to various aspects of the invention. System 100 may perform various tasks related to restoring a hard drive after failure. For example, system 100 may dynamically collect and save disk recovery data from an operational, online client (e.g., to backup systems or data repositories). A client-specific recovery module may be generated, which may include the collected recovery data and a footprint operating system (e.g., a recovery environment). The footprint operating system may automatically restore a hard drive (e.g., by writing configuration information to the drive as raw data) without having to be installed on a hard drive. As such, restoration tasks may be completed automatically, thereby reducing an amount of user effort and/or expertise needed for restoration. Further, restoration tasks may be performed from a lightweight, client-specific disk recovery module, thereby eliminating a great deal of processing overhead, such as that attributable to installing set up programs, rebooting a system during set up, or other overhead.

In various implementations, system 100 may include any suitable arrangement for communicatively coupling a server 102 to one or more clients 104. For example, system 100 may be implemented in a client-server architecture spanning one or more networks 112, in an environment having a pool of servers 102, or in other ways. Server 102 may include or be communicatively coupled to a memory 120, a processor 125, an interface 117, a media generation component 127, a recovery manager 130, and/or a data repository 135. Memory 120 may store various types and forms of data, including disk recovery data 170 (e.g., collected from server 102 and/or clients 104) and collected backup data 175, among other things. Media generation component 127 may be any combination of hardware and/or software for creating a recovery media 140, such as a CD or DVD writer/rewriter, a floppy disk drive, a tape drive, or any other similar suitable component. Interface 117 may be any combination of hardware and/or software for communicating with other components (e.g., a network card for communicating with client 104 via network 112). Data repository 135 may be any suitable electronic storage facility, data processing center, archive, database, or other suitable repository for storing electronic information. For example, in various implementations, server 102 may receive disk recovery data 170 and/or backup data 175 from client 104 (e.g., via interface 117), and the received data may be stored in memory 120, data repository 135, or various combinations thereof.

Disk recovery data 170 may include various parameters, variables, algorithms, instructions, rules, or other information to restore a hard drive to its original settings. Disk recovery data 170 may include configuration information for client 104 at various levels of granularity. For example, at a host level, disk recovery data 170 may include, among other things, a machine host name, an operating system version, and/or a total number of hard disks. At a disk level, disk recovery data 170 may include, among other things, a SCSI/RAID adapter name, a number of bytes per sector, a number of sectors per track, a number of tracks per cylinder, a number of total cylinders, a total disk size, a disk identifier (e.g., a number, signature, etc.), a vendor, one or more flags (e.g., indicating whether a disk is a dynamic disk, cluster disk, etc.), a total amount of free space, and/or a total number of partitions. At a partition level, disk recovery data 170 may include, among other things, a boot indicator, a partition identifier (e.g., a number), a starting offset, a total length, and/or a partition type. At a file system level, disk recovery data 170 may include, among other things, a drive letter, a file system type (e.g., FAT, FAT32, NTFS, etc.), a total amount of space, a total amount of free space, a global unique identification volume name, a volume label, a file system attribute (e.g., compression), and/or mount point information (e.g., for a reparsed point). In some implementations, disk recovery data 170 may further include raw data from one or more predetermined disk regions. For example, Microsoft Windows may support RAID software simulation using Windows dynamic disks by storing raw data at predetermined disk regions (e.g., a sixth (6th) sector and/or a last one (1) megabyte of raw disk bytes). As such, disk recovery data 170 may include such raw data, which may be used when restoring a failed hard disk.

Backup data 175 may include any files, data structures, application data, system data, or other information that describes a state of client 104. For example, backup data 175 may include documents, spreadsheets, pagefiles, CPU contexts, memory dumps, audits, reports, archives, or other information. In some implementations, backup data 175 may be used to provide data to reinstall or recover applications after disks and partitions have been restored for a failed hard drive. Further, backup data 175 may include user data, such as work documents, images, media files, or other user data, which may be restored when recovering a hard drive. Accordingly, when a hard drive fails, disk recovery data 170 may be used, for example, to restore the failed hard drive to a previous operational state, while backup data 175 may be used, for example, to restore lost data that was stored on the hard drive before failure.

In some implementations, disk recovery data 170 and/or backup data 175 may be formatted, stored, and/or defined in one or more tables of a relational database described using Structured Query Language (SQL) statements and/or scripts and/or using various data structures in text files, extensible Markup Language (XML) documents, Virtual Storage Access Method (VSAM) files, flat files, Btrieve files, comma-separated-variable (CSV) files, internal variable, and/or one or more libraries. Further, disk recovery data 170 and/or backup data 175 may be stored locally (e.g., in memory 120), remotely (e.g., in a data repository 135), and/or using various combinations thereof.

Recovery manager 130 may include various modules and instructions for, among other things, collecting disk recovery data 170 and/or backup data 175 from client 104, determining when a disk on client 104 has failed, and/or generating a client-specific recovery module using the collected disk recovery data 170 and/or backup data 175. Recovery manager 130 may enable (e.g., via a graphical user interface) creating bootable media (e.g., a CD-ROM), creating ISO images, configuring a back-end, a configuration wizard module, backing up changes, integrating logging activities, defining sessions, restoring a disk, restoring a network connection, and/or restoring to different hardware.

Client 104 may be any suitable computing or processing device that includes at least one hard drive 160. Client 104 may further include a graphical user interface 116, a local and/or distributed agent 150, and an operating system 155. Hard drive 160 may store operating system 155, system data, user data, or other information, as would be apparent to those skilled in the art. When hard drive 160 fails, becomes corrupted, or is otherwise compromised in any way, functionality and performance of client 104 may be affected in various ways. For example, client 104 may be prevented from booting or otherwise starting up when a failed hard drive 160 includes boot information. When hard drive 160 fails, recovery may include restoring valid volumes and file systems, which may handle all disk input and output operations, before restoring data at a file level. For example, an application program interface for locating a disk volume may vary according to a volume type (e.g., a DeviceIOControl API for a basic volume may be IOCTL_STORAGE_GET_DEVICE_NUMBER, whereas the DeviceIOControl API for a dynamic volume may be IOCTL_VOLUME_GET_VOLUME_DISK_EXTENTS). Accordingly, to properly automate and hasten recovery of hard drive 160, disk recovery data 170 may be used to restore disk settings and input/output handles, and backup data 175 may subsequently be used to restore data at the file level.

Graphical user interface 116 may include one or more customizable frames or views having interactive fields, buttons, pull-down lists, or other interfaces for performing disk recovery. For example, graphical user interface 116 may present one or more screens for generating media, recovering disks, or performing other tasks. For example, the screens may enable a user to create a disk image or a machine-specific media, configure disk recovery location information, or perform other tasks.

Agent 150 may include any script, library, object, executable, service, daemon, or other process that may send disk recovery data 170 and/or backup data 175 to server 102 backup repository 135 (e.g., via server 102). Disk recovery data 170 and/or backup data 175 may be generated in various ways, such as while client 104 is online and operational, during a backup process for selected nodes, upon a user request, or in other ways. Agent 150 may provide a simple and secure method of monitoring, gathering, or otherwise generating disk recovery data 170 and/or backup data 175. Further, agent 150 may securely transmit disk recovery data 170 and/or backup data 175 to storage for subsequent recovery in an event of failure of hard drive 160. In some implementations, agent 150 operate as a hidden service or process that displays events to the user in a managed fashion, while preventing certain users from accessing underlying security mechanisms and/or parameters, as necessary. For example, agent 150 may include a dynamic link library (DLL) that may be automatically and/or manually loaded at startup, upon connection to a network or other system component, or via other techniques or in response to other events.

In some implementations, agent 150 may be a back-end service or process coupled to graphical user interface 116, whereby agent 150 may enable the user to perform various tasks. For example, tasks may include creating ISO images or specifying locations for operating system files, temporary directories to use during recovery, entry points for network adapters, entry points for SCSI drivers, directory/file names for a particular image, and/or other tasks. Further, agent 150 may be configured to populate graphical user interface 116 with status indicators indicating a status of various operations, such as information collection. Agent 150 may be communicatively coupled to recovery manager 130, whereby agent 150 may transmit and/or receive data from server 102.

Figure 1B:
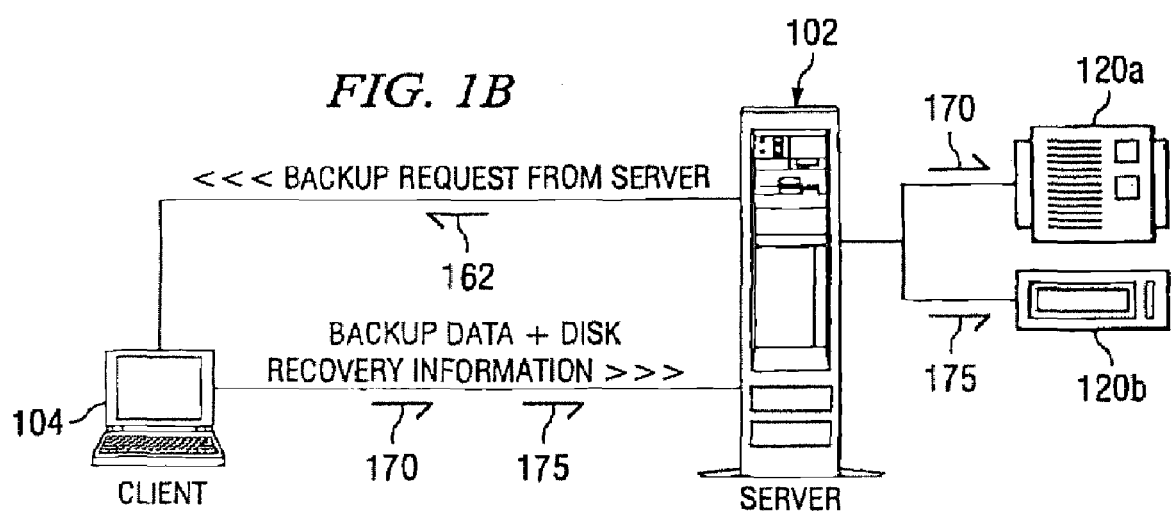

Referring to FIG. 1b, an exemplary pre-failure system is provided according to various aspects of the invention. At some point in time before a hard drive 160 has failed, a snapshot of client 104 may be taken. For example, while client 104 is operational and online, agent 150 may invoke a disk recovery procedure. The disk recovery procedure may include verifying a request for generating disk recovery information and determining a type of disk recovery generation. For example, disk recovery generation may include a backup of a single client 104, a partial node of clients 104, an entire node of clients 104, etc.

The disk recovery procedure may be initiated in response to a request from a user, from server 102, at predetermined intervals, or in other ways. Server 102 may establish a network connection with agent 150, and subsequently issue a request 162 to initiate the disk recovery procedure. For example, server 102 may enable disk recovery support by setting a flag in a data structure (e.g., a NODE_INFO structure may include a SRV_ADVDR_SUPPORT flag), wherein the structure may be sent by server 102 after a network connection has been established between server 102 and agent 150.

Once server 102 and agent 150 are communicatively coupled, server 102 may issue backup request 162, and agent 150 may subsequently initiate the disk recovery procedure. Agent 150 may generate disk recovery data 170 and/or backup data 175 specific to machine 104, wherein the generated disk recovery data 170 and/or backup data 175 may be collected, formatted, and stored in any suitable manner. For example, agent 150 may call a generation procedure (e.g., a GetClientAADRInformation( ) function). Agent 150 may provide a reliable location for the generated disk recovery data 170 and/or backup data 175. For example, in some implementations, previous versions of the generated disk recovery data 170 and/or backup data 175 may be overwritten to ensure that only up-to-date information is maintained. However, in some implementations, several versions of the generated disk recovery data 170 and/or backup data 175 may be maintained for auditing, application management, or other reasons.

After generating disk recovery data 170 and/or backup data 175, agent 150 may initiate a session with server 102 to send the generated data to server 102 for saving and/or storing the data for subsequent retrieval and/or use. Agent 150 may communicate various commands to server 102 to indicate a state of the initiated session. For example, the commands may indicate a state of disk recovery begin of session (e.g., DR_BOS), disk recovery begin of file (e.g., DR_BOF), disk recovery middle of file (e.g., DR_MOF), disk recovery end of file (e.g., DR_EOF), and/or disk recovery end of session (e.g., DR_EOS). As such, agent 150 may provide updated disk recovery data 170 and/or backup data 175 during various sessions, which may occur at predetermined, configurable times. For example, agent 150 may collect disk recovery data 170 and/or backup data 175 at a first predetermined interval (e.g., every thirty seconds), and may communicate the collected data at a second predetermined interval (e.g., once per day). In another example, agent 150 may monitor a registry, or other system data, of client 104 for changes, and agent 150 may communicate the changes to server 102 as they occur. In another example, agent 150 may detect a network connection with server 102, and agent 150 may automatically gather and transmit disk recovery data 170 and/or backup data 175 upon the detection. Accordingly, a snapshot of disk recovery data 170 and/or backup data 175 from client 104 may be collected, stored, and updated using any suitable combination of triggering mechanisms, scheduling intervals, or other techniques, as will be apparent to those skilled in the art. Further, the snapshot(s) may be stored locally (e.g., at client 104), remotely (e.g., at server 102), and/or using variations combinations thereof, as will be apparent to those skilled in the art.

Figure 1C:
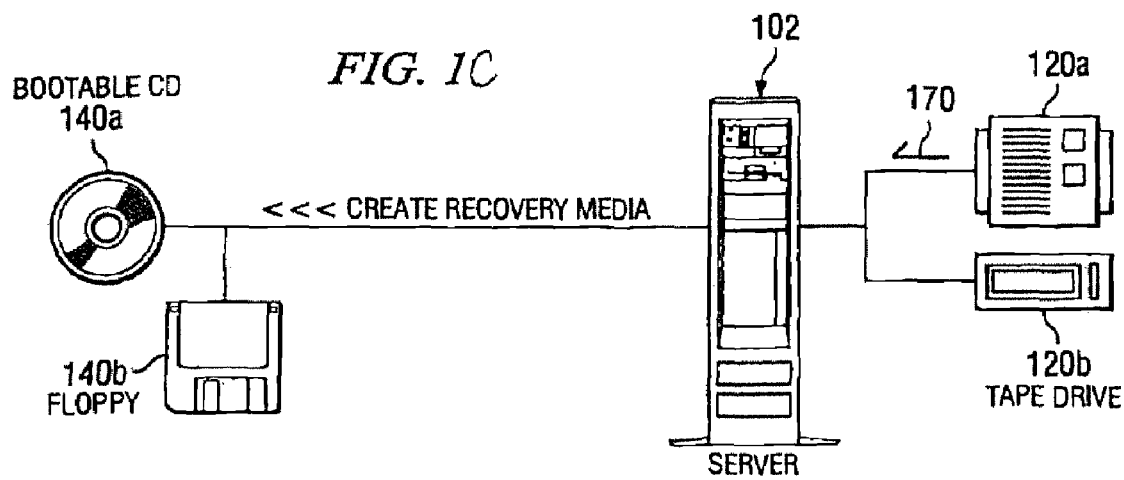

Referring to FIG. 1c, an exemplary post-failure system is provided according to various aspects of the invention. When a failure of hard drive 160 is detected, recovery media 140 may subsequently be generated (e.g., a bootable CD-ROM 140a, a floppy disk 140b, etc.). Recovery media 140 may include a footprint operating system (e.g., a recovery environment), disk recovery data 170, and/or backup data 175, wherein the data may be stored in a memory 120 (e.g., a local memory, a backup drive 120a, a tape drive 120b, etc.) associated with server 102. The failure may be detected manually (e.g., by a user), or using recovery manager 130, agent 150, or any other suitable technique, as will be apparent to those skilled in the art. Further, the generation of recovery media 140 may be effected in response to a user request, or automated by one or more of recovery manager 130, agent 150, or any other suitable technique, as will be apparent to those skilled in the art.

Figure 1D:
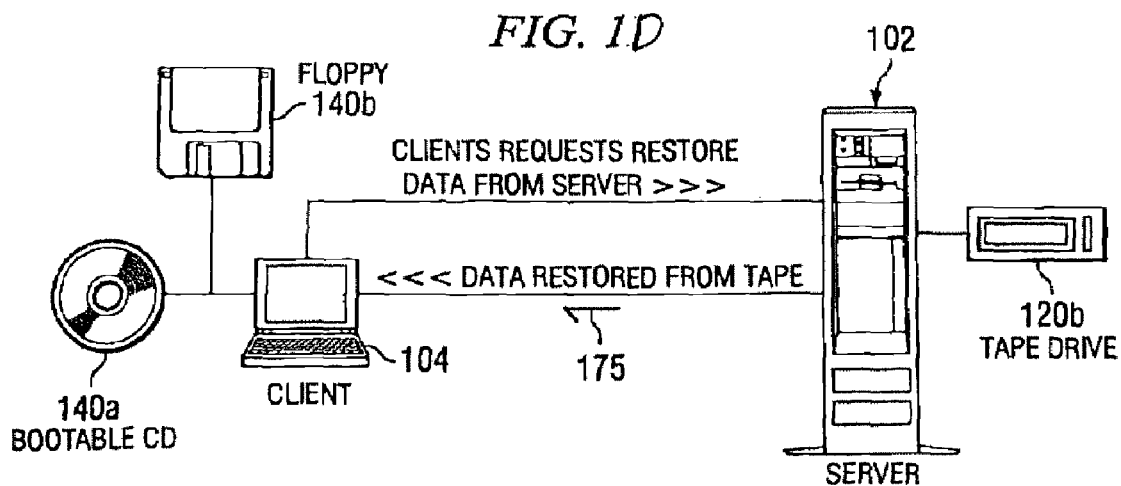

Referring to FIG. 1d, the generated recovery media 140 may be loaded, installed, or otherwise used on client 104 to recover failed hard drive 160. The recovery environment included on recovery media 140 may be a fully bootable environment, without having any reliance on hard drive 160. The recovery environment may be a stripped down version of a conventional operating system, and may reside entirely on a bootable media (e.g., a CD-ROM). Further, the recovery environment can be loaded and run from memory (e.g., RAM) of client 104. For example, in some implementations, a recovery environment may be a stripped down version of Windows XP, and may include driver supports for various Windows compatible SCSI, RAID, or other hard drive adapters. Moreover, the recovery environment may include various Windows application program interfaces and other utilities. The drivers and application program interfaces may be kept up to date by periodically identifying new drivers, application program interfaces, and utilities as they become available using techniques that are well known to those skilled in the art. The recovery media 140 may be loaded in client 104, and subsequently may establish a run-time recovery environment that identifies a failed hard drive 160, or a partition thereof, in client 104. The identified hard drive 160 may then be recovered to an operational state based on at least disk recovery data 170 included on recovery media 140. Client 104 may subsequently request user data, system data, applications, and/or other data from server 102, repository 135, or elsewhere, and such data may be restored to client 104 using backup data 175. In some implementations, backup data 175 may be loaded onto recovery media 140, and as such, establishing a connection or requesting data from server 102 may be unnecessary.

Figure 2:
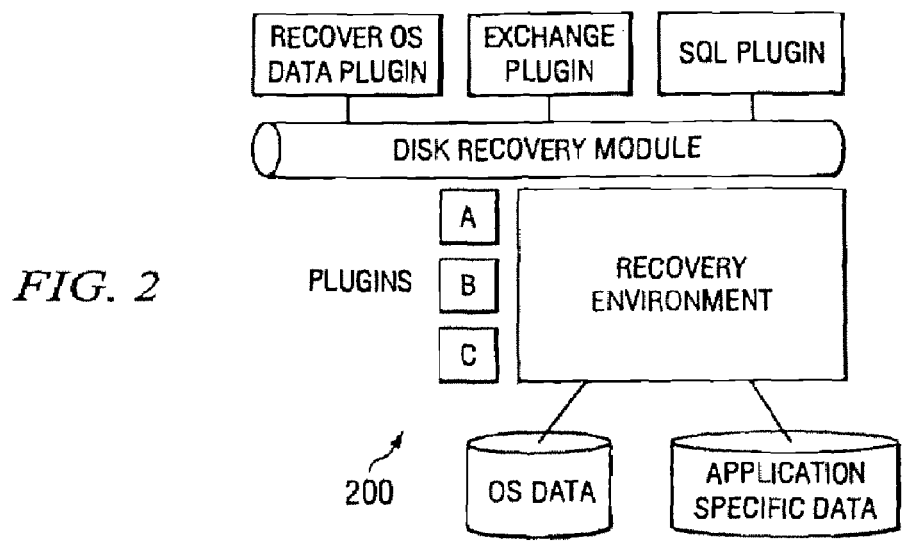
FIG. 2 illustrates an exemplary implementation of a recovery architecture according to various aspects of the invention.

Referring to FIG. 2, an exemplary implementation of a recovery architecture 200 is provided according to various aspects of the invention. Recovery architecture 200 may be a set of computer-executable instructions embodied on any suitable computer-readable media, such as recovery media 140, where the instructions may reference, execute, or implement any or all of architecture 200. Recovery architecture 200 may include a recovery environment, which may reference footprint operating system data and/or application specific data. Furthermore, the recovery environment may reference or execute a disk recovery module, which may handle various tasks relating to restoring a failed hard drive 160. The disk recovery module may include plug-ins for facilitating such restoration tasks, such as a plug-in for recovering operating system data, establishing exchanges, SQL querying capabilities, or other disk recovery tasks. Moreover, one or more additional plug-ins may be provided that add functionality, processing, and compatibility capabilities.

Recovery media 140 may quickly restore a failed hard drive 160, and may provide several advantages over existing systems. For example, client 104 may be booted (e.g., by a user) from recovery media 140, and the recovery environment may be loaded and executed without using hard drive 160. The recovery environment may be a stripped down version of an operating system, or a recovery version or portion of an operating system operable to execute and run from media 140, such as a CD, without using hard drive 160. This feature may eliminate a need to install an intermediate operating system onto hard drive 160, thereby providing a faster recovery path. Further, recovery media 140 may include information about a destroyed, disabled, or otherwise failed hard drive 160, such as recovery data 170 and/or backup data 175. Accordingly, the recovery environment may automatically recreate a system configuration, connect to various components (e.g., server 102, a locally attached tape drive, etc.), restore a file system and/or system state data, and, if necessary, reboot client 104, thereby efficiently restoring client 104. The recovery environment may eliminate reboots entirely during a restore process for a basic disk, or in the case of a dynamic disk, reducing a number of reboots to one. In some implementations, the recovery environment may natively support creating, modifying, and otherwise formatting hard disk partitions, thereby ensuring maximum compatibilities with an operating system 155 of client 104. Moreover, the recovery environment may include drivers for various network cards, SCSI cards, and other types of hardware. Further, new drivers may be added as appropriate, thereby keeping the environment up to date and responsive to various kinds of hardware.

The disk recovery environment may process or handle basic disks, dynamic disks (e.g., non-system or non-boot disks), cluster shared disks, optical disks, volume mount points, volume globally unique identifiers, drive letters, or other hard drive configurations. Moreover, the environment may enable a user to select which disks to restore or not restore, save a master boot record code during backup, use the master boot record code during restore, or perform other tasks. In some implementations, the recovery environment may include a command line interface, wherein a user may use the command line interface to get/set disk layouts by disk number, or perform other tasks. The recovery environment may include various other modules to restore various system settings during restoration (e.g., network settings), where system settings and configurations may be saved during backup, and used during restoration. For example, network configuration information may include IP and DHCP host configurations, multiple network interfaces, or other information. Other features may include changing adapters between backup and restore, or assigning IP addresses to adapters in various ways. For example, IP addresses may be assigned automatically, manually, using an index (e.g., based on a link speed or adapter name), or in other ways.

Figure 3A:
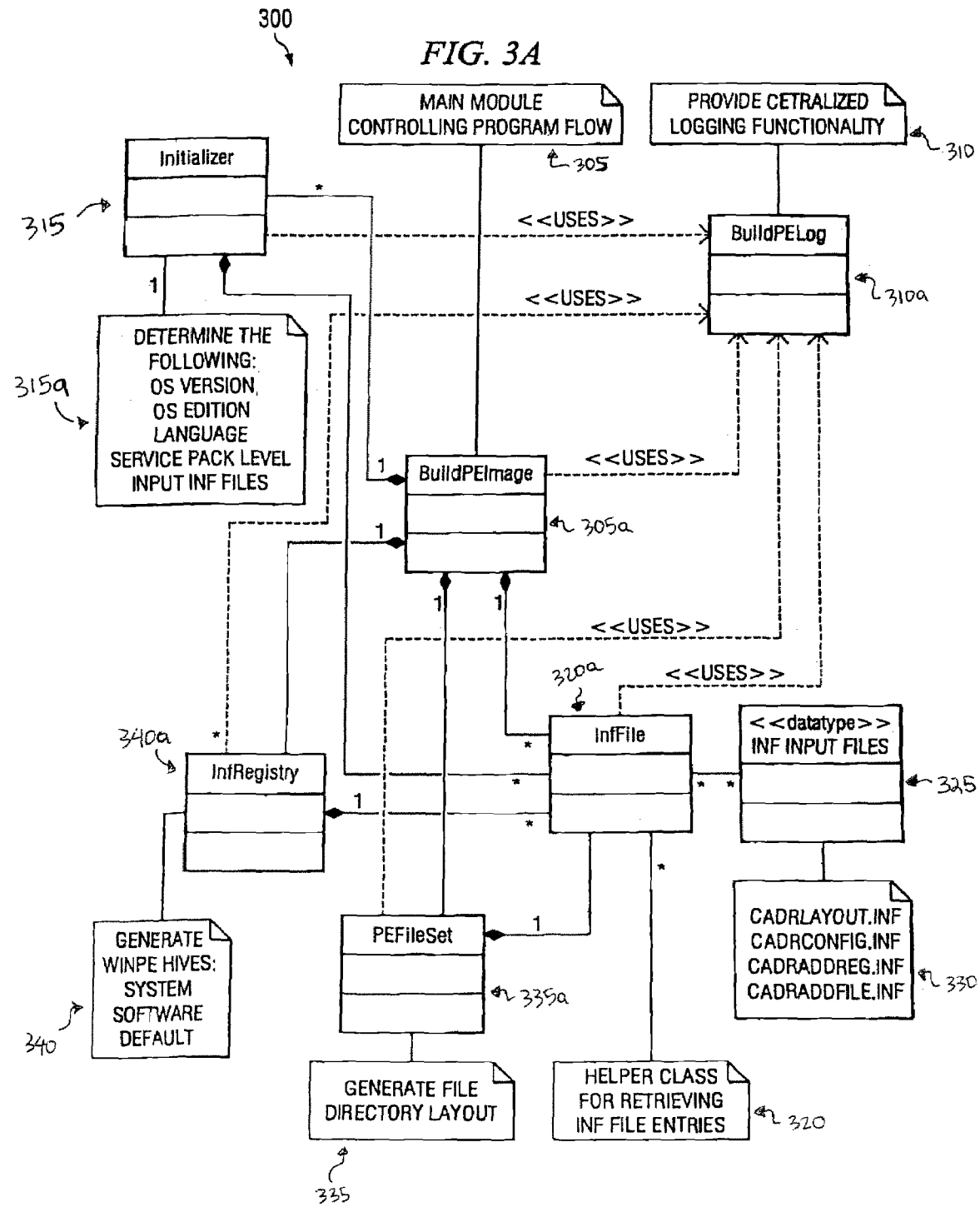
FIGS. 3a-b illustrates an exemplary recovery module according to various aspects of the invention.
Figure 3B:
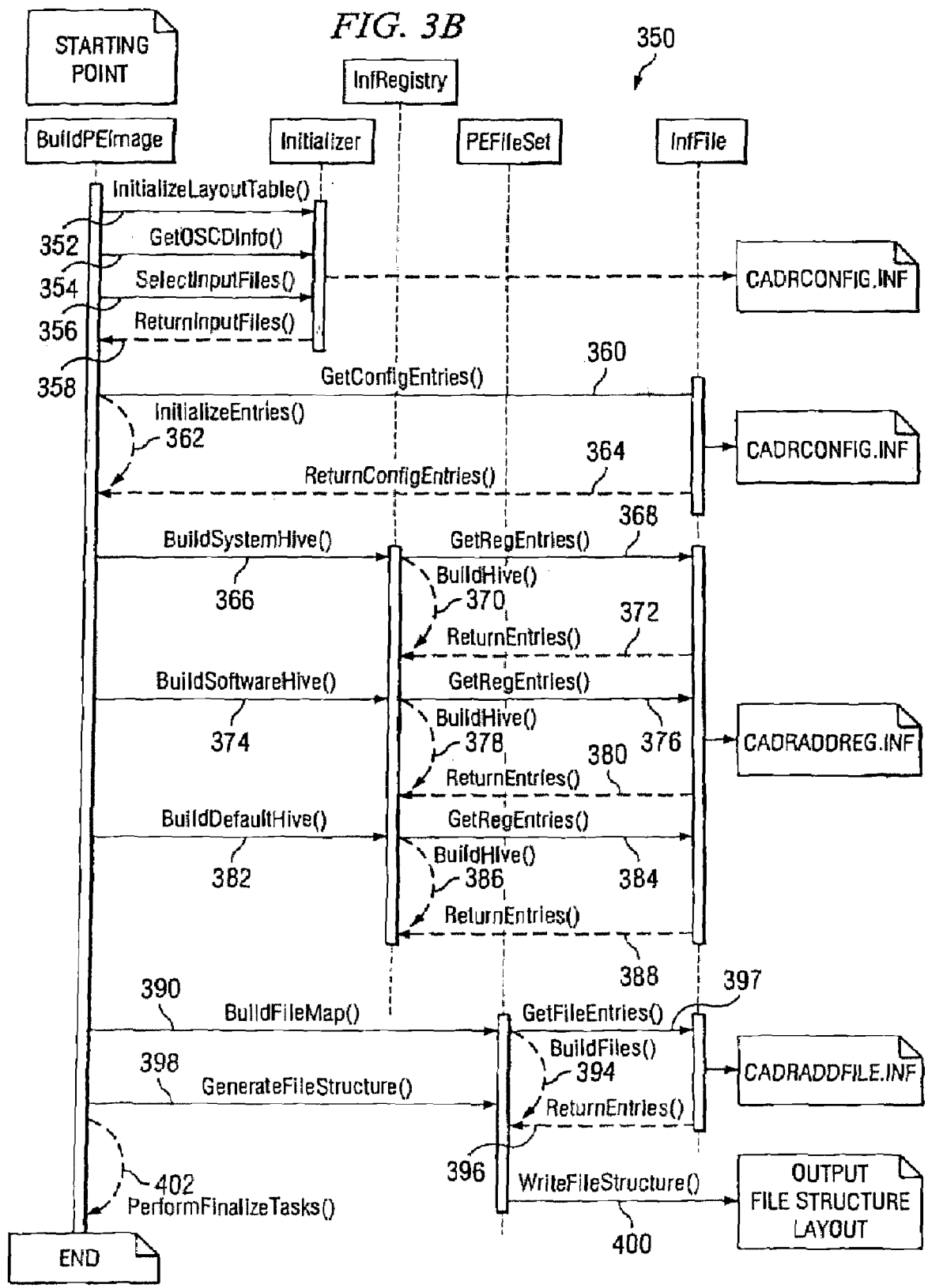

FIGS. 3a-b illustrates an exemplary recovery module 300 according to various aspects of the invention. Recovery module 300 may be implemented by agent 150, recovery manager 130, or various combinations thereof. The recovery process may include instantiating or invoking various objects, classes, and/or interfaces, which may enable execution of various recovery tasks. For example, the objects, classes, and/or interfaces may include a main class 305 (e.g., BuildPEImage 305a) for controlling program flow, a logging class 310 (e.g., BuildPELog 310a) for providing centralized logging functionality, an initializer class 315 (e.g., Initializer 315a) for performing various initialization tasks, a helper class 320 (e.g., InfFile 320a) for retrieving .INF file entries 330 from an .INF file database 325, a file directory class 335 (e.g., PEFileSet 335a) for generating a file directory layout, a registry class 340 (e.g., InfRegistry 340a) for generating system software defaults, or other classes, modules, and/or interfaces as would be necessary and apparent to those skilled in the art.

Main class 305 may be a master class for controlling program flow. Main class 305 may determine how and what to parse from .INF files 330, and may call initializer class 315 to perform various preliminary initializing tasks. Once settings have been determined from the configuration .INF files 330, main class 305 may call registry class 340 to build system, software, and default registry hive files. Registry hives are conventionally known, and may include a set of files stored on a hard drive that are loaded when a system boots up, and are subsequently used as registry keys. Subsequently, main class 305 may call file directory class 335 to generate a recovery file structure at a staging location. Main class 305 may also be responsible for other miscellaneous tasks, such as adding network drivers, SCSI drivers, finalizing a whole image, or other tasks.

Logging class 310 may be used for logging purposes, and may provide a centralized and uniformed logging mechanism for all other classes in the program. For example, in some implementations, logging class 310 may check a predefined registry key to determine logging levels set by a user, where a logging preference may indicate that to filter out messages having a priority level below the logging level.

Initializer class 315 may perform various initialization tasks for main class 305. Initializer class 315 may read an .INF file entry 330 that provides layout information (e.g., cadrlayout.INF), and may construct file-matching tables based on the layout information. The file-matching tables may subsequently be used to identify information about an operating system (e.g., the recovery environment), such as a version, edition, service pack level, and/or language of the operating system. The operating system version, edition, and service pack level may be recognized through using predefined tag files on an operating system CD, such as recovery media 140. The operating system locale (i.e., language-related, user-preference information represented as a list of values) may be normally identified by checking a locale identifier entry of a predetermined file (e.g., txtsetup.sif). Locale identifiers are conventionally known, and may include 32-bit identifiers, as defined by Microsoft Windows, that include a language identifier, a sort identifier, and reserved bits for identifying a particular language.

Once information about the operating system has been gathered, initializer class 315 may select input files for building an image of the recovery environment. A set of possible input files may be selected from among .INF file entries 330 (e.g., cadrconfig.INF, cadraddreg.INF, cadraddfile.INF), and/or any variations thereof. For example, more than one of .INF files 330 may be used because of variations in service pack level, language, or other configurations, wherein different .INF files 330 may include relevant information. For example, a first file 330 (e.g., cadrconfig.INF) may be specific to an English language Windows 2003 Server SP1 operating system whereas a second file 330 (e.g., cadraddreg.INF) may be specific to a German language Windows XP Professional operating system. In some implementations, .INF files 330 may be base files, wherein each of .INF files 330 may be used if a corresponding "specific" file does not exist on a source operating system CD.

Initializer class 315 may select input files for main class 305 by performing a series of steps to determining relevant files. First, initializer class 315 may search database 325 for a specific file among .INF files 330 that corresponds to the operating system, where .INF files 330 may be checked for version criteria, edition criteria, language criteria, and service pack level criteria. When initializer class 315 finds the corresponding specific .INF, it may be used as an input file for main class 305. However, when an exact match for the specific file cannot be found, initializer class 315 may search database 325 for .INF files 330 that correspond to a specific version, edition, and/or language of the operating system. Further, initializer class 315 may search database 325 for an .INF file 330 having a highest service pack level. When no matches can be found for the specific version, edition, and/or language, a default input .INF file 330 may be used (e.g., cadrconfig.INF, cadraddreg.INF, and/or cadraddfile.INF).

Helper class 320 may facilitate parsing any standard .INF file (e.g., .INF files 330 stored in .INF input database 325), and may be used by other classes to read an input .INF file. In other words, helper class 320 may enable other modules, classes, or interfaces to retrieve information from .INF files in a structured manner.

File directory class 335 may be used by main class 305 to generate a file directory layout structure of an advanced application disaster recovery CD image (e.g., recovery media 140) at a staging location. .INF files 330 may include information on which set of layout files and/or cab files to use, along with assembly information. .INF files 330 may further include specific entries for copy files to use by the recovery environment.

Registry class 340 may be used by main class 305 to rebuild system, software, and/or default registry hives. Various .INF files 330 may include information on how to build each of the system, software, and/or default hives for the operating system.

Further, recovery module 300 may include an exposed application program interface for initializing a restore process, building registry hives, building a CD image, setting custom working locations, and/or performing other operations. For example, the exposed application program interface may include various functions to perform such tasks, each of which may return a zero (0) value to indicate success, or a non-zero value to indicate an error. Various other application program interfaces may be exposed to external modules (e.g., via a command line interface), thereby enabling programmatic creation of various routines for performing restoration, or manual restoration using the exposed application program interfaces. For example, an exposed console interface (e.g., the command line interface) may enable a use to input structured commands to build a boot CD image, generate an ISO CD image, verify the CD images, add drivers (e.g., .INF files for SCSI cards or drives, network cards, etc.), verify the drivers, delete working folders, or perform many other tasks. Various variations of exposed application program interfaces are possible, as would be apparent (e.g., the application program interfaces may be exposed via a graphical user interface that guides a user through restoration).

For example, in some implementations, a non-exhaustive set of the exposed application program interfaces may take the form depicted in the following table:

| Function | Parameters | Purpose |
|---|---|---|
| DWORD InitializeBuildParam | (LPTSTR CD_Source_Path, LPTSTR Staging_Path, LPTSTR Resource_Path); | Initialize various paths |
| DWORD GenerateBasedCDImage | ( ); | Generate CD image |
| DWORD AddSCSIFloppyDriver | (LPTSTR Floppy_Path); | Add drivers for SCSI drive |
| DWORD AddNetworkDriverFiles | (LPTSTR infFilePath, LPTSTR sysFilePath, LPTSTR pnfSourcePath); | Add drivers for network card |
| DWORD LogMessageToFile | (DWORD errNo, LPTSTR Str); | Log messages to a file |
| DWORD CheckIfCDSupported | (LPTSTR sourceCDPath, LPTSTR resourcePath, bool *supported); | Verify CD |
| DWORD CheckIfSCSIFloppyIsGood | (LPTSTR floppyPath, bool *valid); | Verify drivers for SCSI drive |
| DWORD CheckIfNetworkInfIsGood | (LPTSTR infPath, bool *valid); | Verify drivers for network card |
| DWORD Generate ISOCDImage | (LPTSTR isoPath, LPTSTR bootImagePath, bool removeFolder); | Generate ISO CD image |

In another example, a non-exhaustive set of commands accepted by the exposed console interface may take the form depicted in the following table:

| Command | Qualifiers | Purpose |
|---|---|---|
| drcdimage i | [cd path] [working folder] [resource folder] | Build boot CD image |
| drcdimage s | [working folder] [floppy path] | Add SCSI driver |
| drcdimage n | [working folder] [inf path] [sys path] [optional pnf path] | Add network driver |
| drcdimage c | [cd path] [resource folder] | Verify CD |
| drcdimage d | [SCSI/NET path] | Verify drivers for SCSI drive/network card |
| drcdimage g | [working folder] [iso path] [boot image path] [−d] | Generate ISO CD image, where −d flag indicates to delete working folder |

When restoring a hard drive from recovery media 140, recovery media 140 can be considered a primary input. Accordingly, recovery media 140 may require configuration information to build a bootable CD image layout that can restore disk recovery data 170 to a hard drive 160. For example, the CD image may be using an .INF file 330 (e.g., cadrlayout.INF) that includes operating system identification information and/or language specific information. Accordingly, initializer class 315 may use the .INF file 330 to identify the operating system CD version, edition, service pack level, and language, among other things. The information may be identified by inspecting a signature file at a root level on the built CD image (e.g., \i386\txtsetup.SIF).

For example, a non-exhaustive set of entries in the .INF file 330 may take the form depicted in the following table, wherein such entries may be included at the root level of a bootable CD image when built:

| Entry | Entry Format | Description |
|---|---|---|
| Version | [signature file], [symbol], [version code] | [signature file]: tag file on the CD identifying an OS version [symbol]: abbreviated name assigned to the version [version code]: unique integer assigned to the version |
| Edition | [version code], [signature file], [edition], [symbol], [edition code] | [version code]: See Version Entry [signature file]: tag file on the CD identifying an OS edition [edition]: name of the edition [symbol]: abbreviated name assigned to the edition [edition code]: unique integer assigned to the edition |
| Service Pack | [edition code], [SP file], [symbol], [SP level] | [edition code]: See Edition Entry [SP file]: tag file on the CD identifying a service pack level [symbol]: abbreviated name assigned to the edition [SP level]: integer identifying the service pack level |
| Language Code | [language code hex], [language], [symbol] | [language code hex]: Locale identifier (LCID) [language]: language name [symbol]: abbreviated name assigned to the language |
| Language Spec. File | [file path] | [file path]: path relative to source CD |

.INF files 330 may further include information needed for building the CD image. For example, various .INF files 330 may be used by main class 305 to generate the CD image, build system, software, and default registry hives, define layout files. Moreover, the .INF files 330 may include modifications to a system .SIF file (e.g., txtsetup.SIF), such that the build CD image may be bootable. For example, the .INF files 330 may include entries that take the form depicted in the following table:

| Entry | Entry Format | Description |
| --- | --- | --- |
| System, Software, and/or Default Hives | [hive], [hive file], [subkey], [inf source], [section], [hive destination] | [hive]: Identifies hive to build (i.e., system, software, or default) [hive file]: Existing hive file to preload before applying changes. If empty, build hive from scratch [subkey]: Specify a subkey under the hive to act as root [inf source]: .INF file, relative to source CD, including changes [section]: A section within the .INF file including the changes [hive destination]: Storage destination for the hive (e.g., a file path relative to a destination staging path) |
| Copy Files | [source], [section] | [source]: .INF file, relative to source CD, including entries for copy files [section]: A section within the .INF file including the entries |
| Source Files | [source], [section] | [source]: .INF file, relative to source CD, including entries for source disk files [section]: A section within the .INF file including the entries |
| Pre-Check .CAB files | [source] | [source]: .CAB file, relative to source CD, to search before trying to find files on the CD |
| Post-Check .CAB files | [source] | [source]: .CAB file, relative to source CD, to search when neither Pre-Check nor CD includes needed files |
| Assembly Locations | [source], [destination] | [source]: Source file, relative to source CD [destination]: Destination file, relative to staging location |
| Side-by-Side Assemblies | [source] | [source]: .CAB file, relative to source CD, including Windows side-by-side assemblies |
| Copy and Modify Files | [source], [destination], [section], [entry], [value] | [source]: Source .INF file, relative to source CD [destination file]: Destination .INF file, relative to source CD [section]: Section within source .INF file including entry to modify [entry]: Entry to modify/add [value]: Value for the entry |
| Additional File | [source], [destination] | [source]: Source file, relative to source CD [destination]: Destination file, relative to staging location |
| Additional Source Directory | [directory path] | [directory path]: Full path of any additional sources |

Accordingly, recovery module 300 may create a file representation layout of an image for a bootable recovery media (e.g., a staging folder/directory structure). The file layout may be used as an input by another program to generate the CD-image according to the file/directory structure, using techniques that will be apparent (e.g., CD-burning software). Moreover, recovery module may output a log file (e.g., using application program interfaces of logging class 310).

Figure 4A:
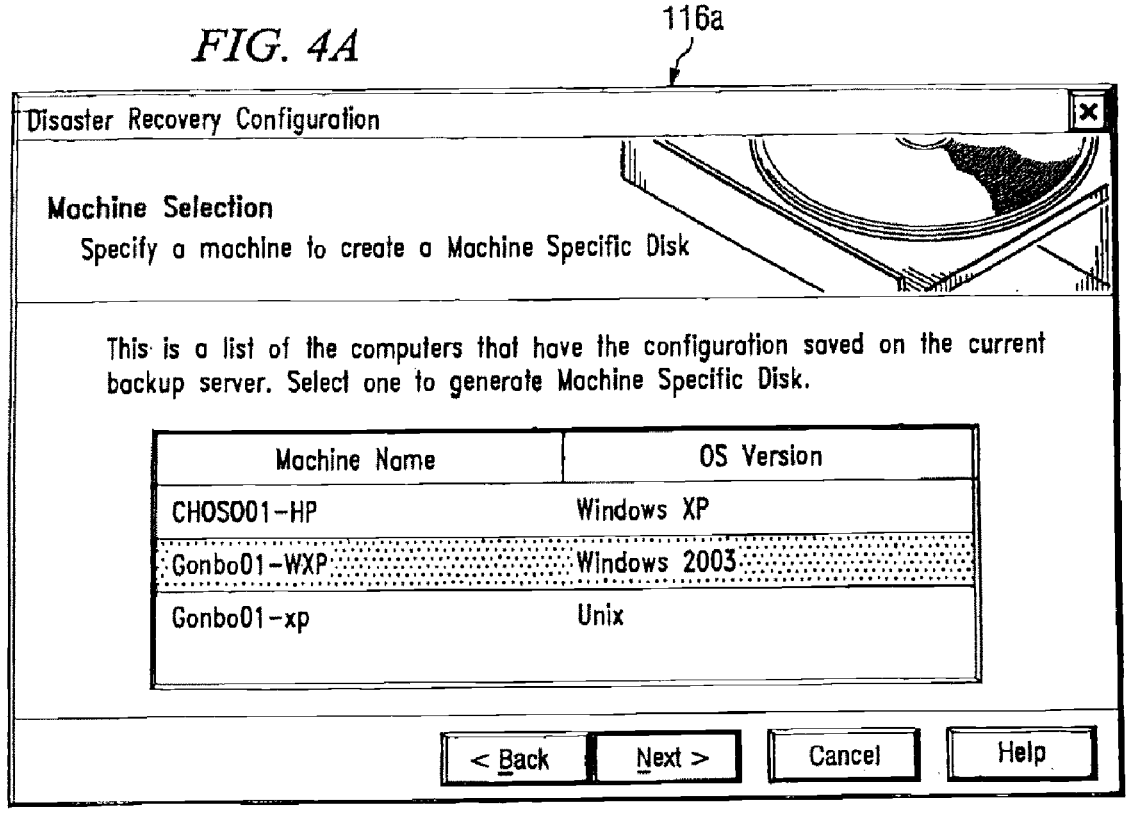
FIGS. 4a-b illustrate exemplary graphical user interfaces for creating a recovery module according to various aspects of the invention.
Figure 4B:
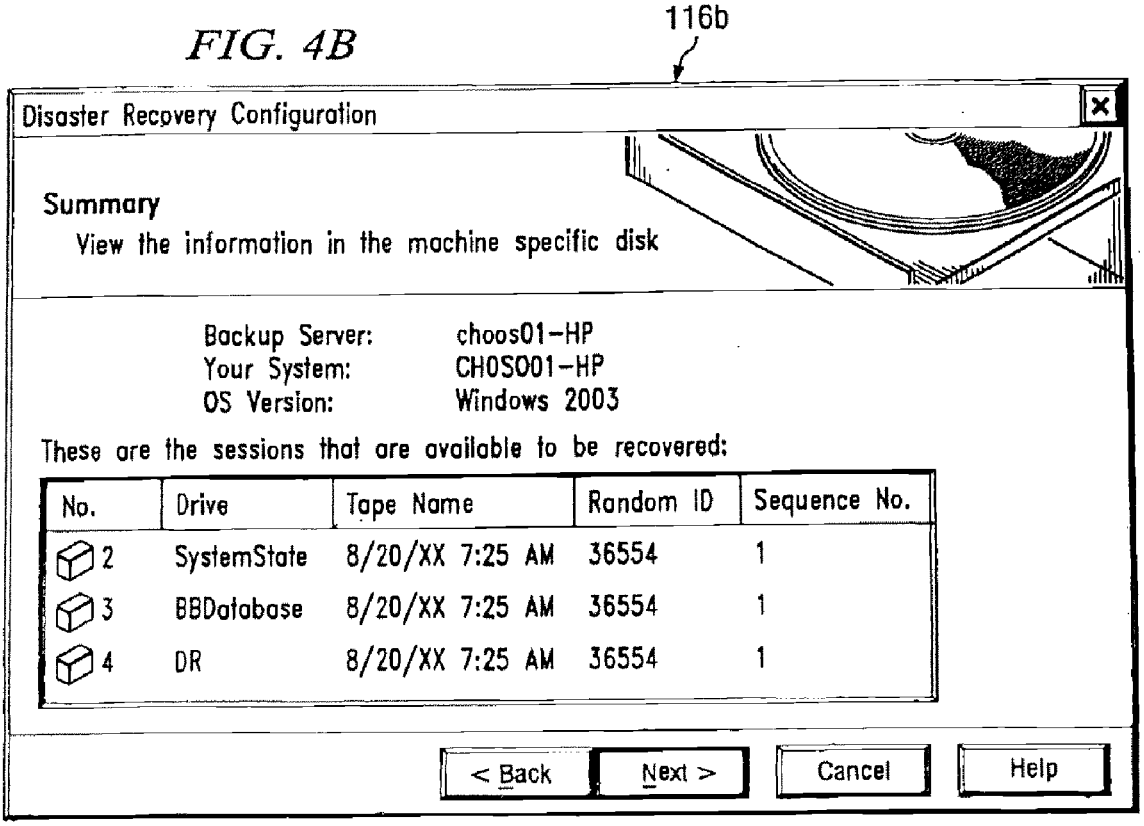

Referring to FIGS. 4a-b, exemplary graphical user interfaces 116 are illustrated for creating recovery media according to various aspects of the invention. Generally, graphical user interfaces 116 may be wizards guiding a user through various disk recovery related activities. In some implementations, the disk recovery activities may be automated, and graphical user interfaces 116 may provide the user with status information about the recovery.

Graphical user interfaces 116 may facilitate various tasks relating to disk recovery. For example, the tasks may include creating an image for recovery media 140 (e.g., including various hardware drivers and configuration information), specifying a staging location for the image, configuring alternate location information, burning the image to create recovery media 140, providing information about using recovery media 140, displaying client hostname and session information, or performing other tasks. Further, graphical user interfaces 116 may update an activity log associated with the tasks, such as for auditing purposes. For example, the activity log may include information about media creation, alternate location configuration, and/or backup creation, among other things. Graphical user interfaces 116 may also provide a context sensitive online help file.

Graphical user interfaces 116 may include a wizard for supervising a process of creating bootable disk recovery media 140. When a user begins the process of creating bootable disk recovery media 140, options may be provided for the user to specify a path of operating system source files, as well as a location to save the image. The creation process may include a background process for ensuring that a machine being used to create recovery media 140 has sufficient disk space for image creation. When the machine has sufficient disk space, the user may subsequently select network drivers, SCSI drivers, or other drivers to add to the image. An ISO CD having the image may subsequently be created (e.g., by burning the image to the CD).

Graphical user interfaces 116 are operable to create recovery media that may be specific to a particular failed hard drive 160. For example, the recovery media may be used to restore failed drive 160 to a pre-failure state, or may be used to configure a new hard drive to a pre-failure state of the failed hard drive, or may be used to create a mirror hard drive to backup an existing hard drive. Other implementations are possible as would be apparent.

Referring to FIG. 4a, an administrator, or other user, may select a machine-specific hard drive having configuration information saved, or otherwise backed up (e.g., on server 102). When the administrator or other user selects one of the machine-specific drives to restore, a summary of machine-specific sessions available for recovery may be displayed, as shown in FIG. 4b. The administrator or other user may select a drive to restore, and subsequently select the 'Next' button, or other suitable graphical selection object, to proceed with creating recovery media 140 corresponding to the selected drive. In some implementations, recovery media 140 may be automatically generated based on the selected drive.

Referring to FIGS. 5a-e, exemplary graphical user interfaces are illustrated for restoring a failed hard drive according to various aspects of the invention. The restoration graphical user interface 516 may include a disk recovery wizard that uses a browser-like interface to guide creating recovery media 140. Each page of graphical user interface 516 may include information about an application name, a current step in the recovery (e.g., a name, description, and/or control elements for the step).

A navigation/troubleshooting bar may enable the user to navigate graphical user interface 516 (e.g., forward and backward using the 'Next' and 'Back' buttons). Further, the navigation/troubleshooting bar may enable the user to troubleshoot disk recovery when an error occurs. For example, when an error occurs, graphical user interface 516 may automatically display a troubleshooting dialog, which enables the user to view and save a disk recovery log, set a level of debug logging, open a console window (e.g., a real-time displays of activity occurring during recovery), and/or other help information.

Graphical user interface 516 may provide mechanisms for accessing a command line prompt, copying log files (e.g., to a floppy disk), updating the user about disk recovery status (e.g., completed tasks, tasks in progress, tasks yet to complete, etc.). Furthermore, the user may use graphical user interface 516 to configure various aspects of disk recovery, such as adapter IP addresses, hostnames, user names, and/or passwords associated with server 102, scanning information for retrieving disk recovery session from various repositories (e.g., local tapes), assigning/unassigning sessions for restore, selecting disks for recreating partitions, or other configurable aspects. As such, graphical user interface 516 may guide restoring a hard drive by identifying a backup server to use when restoring the drive, credentials needed to connect to the backup server, data sessions to retrieve for restoring the drive, and other machine-specific disk recovery information.

Figure 5A:
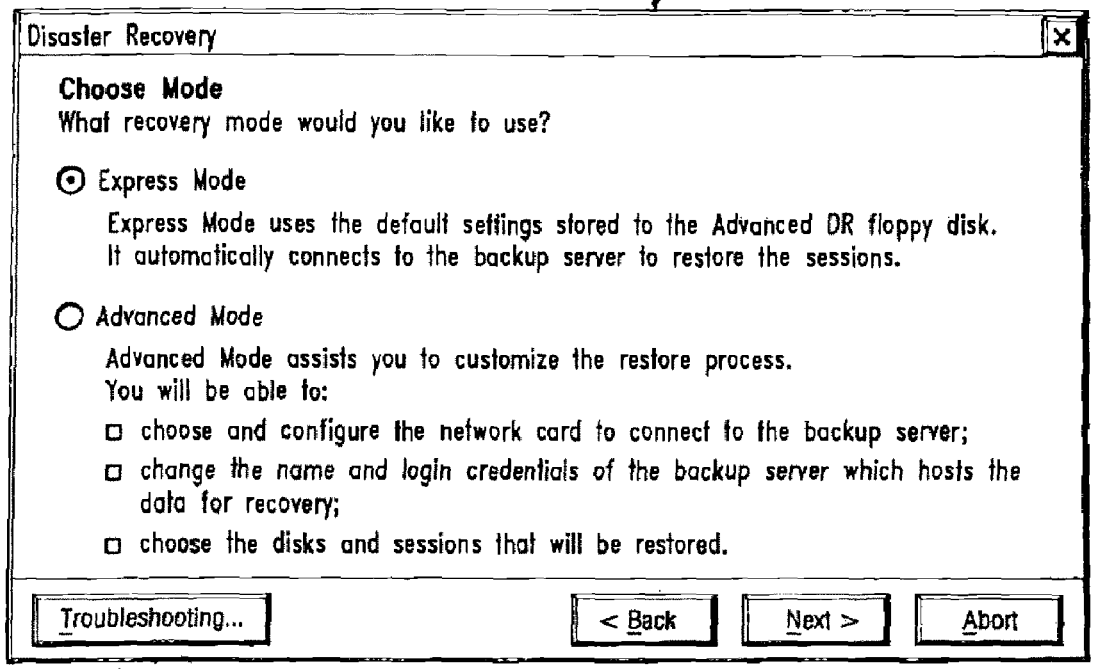

A restoration process may begin by initializing a recovery environment after bootable recovery media 140 has been loaded onto a client 104 to restore. The recovery environment may launch a recovery module, which may attempt to validate recovery media 140, disk recovery data 170, backup data 175, or other things. When a problem or error occurs, a user may be prompted to take action to resolve the error before restoration can proceed. For example, a writable compact-disc media may fail validation when the media is scratched or otherwise unusable. When media 140, disk recovery data 170, backup data 175, and/or other data to write to media have been validated, a user may select a mode for the restoration process, such as an express mode or an advanced mode, as shown in FIG. 5*a*). The express mode may recover a hard drive automatically, often without substantial user intervention, by using default settings. For example, the express mode may connect to backup server 102 to restore sessions. The advanced mode may enable the user to customize the restoration process in various ways, as shown in greater detail in FIGS. 5*b-e*.

Figure 5B:
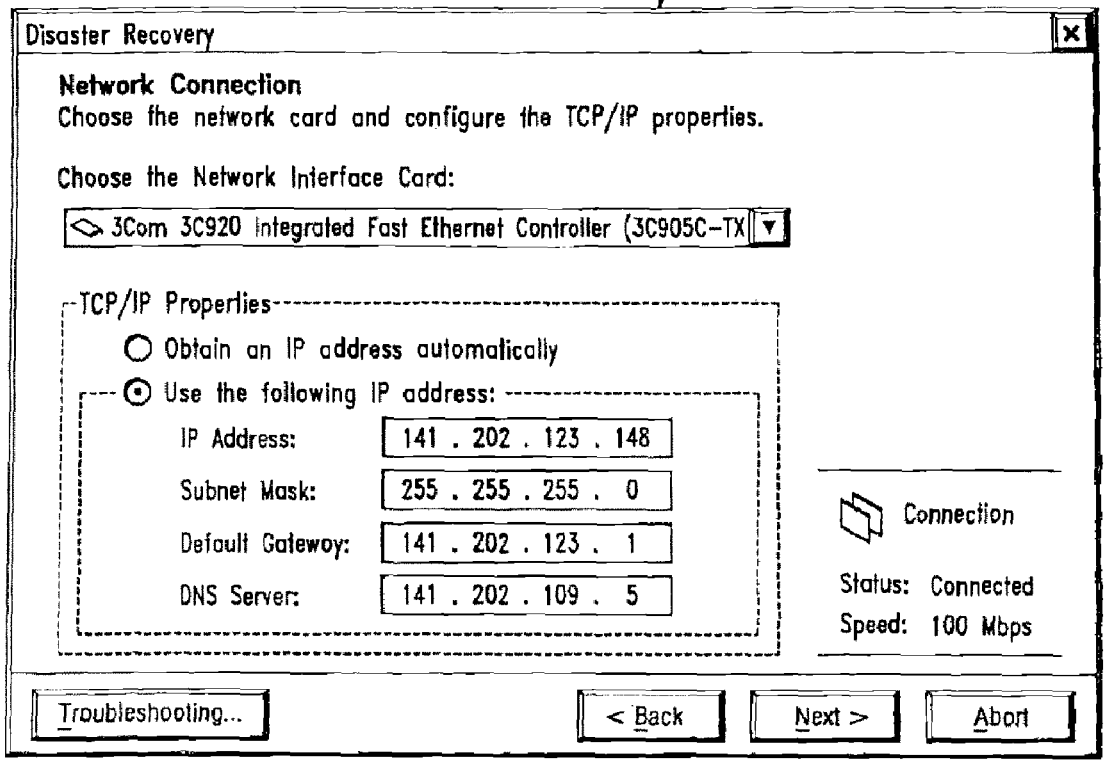

FIG. 5*b* illustrates a graphical user interface 516*b*, whereby the user may configure a network connection. Graphical user interface 516*b* may display a current status of the network connection, which may be pre-populated based upon information stored on recovery media 140 (e.g., whether or not the network connection exists and/or a rate of data transfer over the connection). The user may modify IP address information, subnet masks, default gateways, DNS servers, or the user may specify to automatically obtain such information. The user may press a 'Next' button, or other suitable graphical selection object, which may initiate configuring the network using the information specified by the user.

Figure 5C:
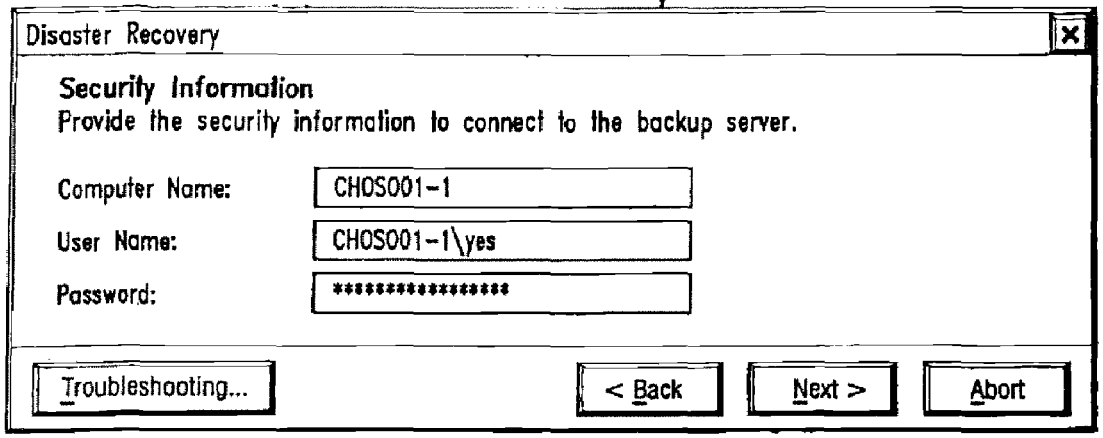

Subsequently, as shown in FIG. 5*c*, a user may specify a host name, user name, and/or password to use when accessing backup server 102. By default, the host name, user name, and/or passwords may be pre-populated with credentials stored on media 140. When the user presses a 'Next' button, or other suitable graphical selection object, the recovery module may attempt to establish a connection to backup server 102.

Figure 5D:
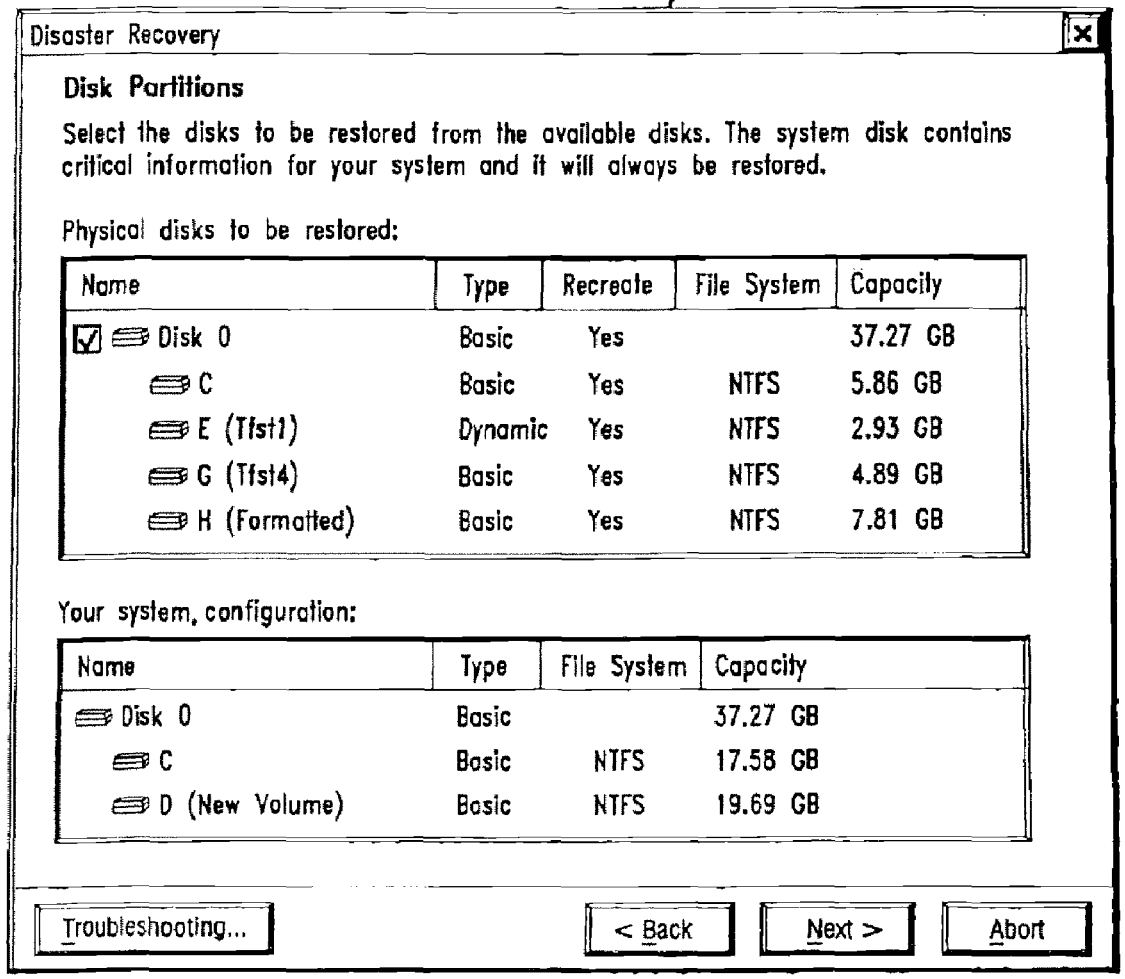

When the connection is successfully established, the user may select which disks to restore, as shown in FIG. 5*d*. Configuration information for current disks of client 104 may be displayed to assist the user in making the selection. In some implementations, the disks having operating system 155 and/or a corrupted file system may be automatically selected for restoration, and the user may be prohibited from unselecting such disks.

After selecting the disks to restore, the user can choose sessions to recover, as shown in FIG. 5*e*. When recovering a session from local memory, graphical user interface 516*e* may display sessions stored on local tapes, which the user may select and from which the data may be recovered. When the user selects sessions other than default sessions, an additional step of identifying a recovery source may occur.

Subsequently, a summary page may be displayed, concluding the advanced mode of user selection. The user may validate selections using the summary page, wherein the summary may display a name of a server 102 being used to restore data, tapes or other media being used during recovery, sessions and volumes to restore, a version of an operating system to install on client 104, and/or other selectable information. The user may optionally navigate back, or otherwise modify, the selections.

The user may subsequently start the restore process, and status information for the restore may be displayed for each session being restored. When the restore cannot complete for any reason, a message may be displayed warning the user of the incompletion. Accordingly, the user may check or save a log file to identify an error and possibly take corrective action. When the restore completes successfully, a message may be displayed indicating such success, and client 104 may be automatically rebooted (if necessary).

Referring to FIG. 6, an exemplary method 600 is illustrated for collecting client information according to various aspects of the invention. Method 600 may include collecting disk recovery data 170 and/or backup data 175, as appropriate, and communicating such data to server 102 for storage (e.g., in repository 135). Disk recovery data 170 and/or backup data 175 may include binaries, registry hives, language, service pack level, and other information about operating system 155, as well as driver information, disk sector and cluster information, and any other suitable information needed to recover a failed hard drive 160. Although method 600 may be performed by recovery manager 130, agent 150, or various combinations thereof, the invention contemplates any appropriate combination and arrangement of logical elements implementing some or all of the described functionality.

Method 600 begins at an operation 602, where a client agent 150 may be initialized. As appropriate, the initialization may include installing client agent 150 to a particular client 104, updating client agent 150, identifying or loading appropriate parameters used or stored by client agent 150, loading or executing client agent 150, or any other appropriate processing.

Subsequently, in an operation 604, client agent 150 may receive a backup job request 162 and associated information. The request may be initiated by recovery manager 130, a user of client 104, an administrator of an enterprise network, or any other appropriate person or component, as would be apparent.

In an operation 606, client agent 150 may identify characteristics of backup server 102. For example, client agent 150 may load a profile stored in local memory 160, may dynamically determines an IP address, or receive manual instructions indicating a location of server 102.

Next, in an operation 608, client agent 150 may identify one or more job options for backup job received in operation 604. Client agent 150 may collect backup data 175 from client 104, wherein such data may include user data, application data, system data, as well as other appropriate information that may be useful to replace when restoring a failed system. The data may be communicated to server 102 in an operation 619 for storage using any appropriate technique or component. For example, server 102 may backup the data to local memory 120, remote repository 135, or any similar and suitable component. In an operation 612, client agent 150 may collect disk recovery data 170, wherein such data may include system data, disk data, partition data, file data, or any other disk related or drive related data at various levels of granularity. Once collected, client agent 150 may transmit the collected disk recovery data 170 to server 102 for storage in an operation 614. In some implementations, operations 608-614 of collecting backup data 175 and/or disk recovery data 170, and transmitting such data to server 102 may occur substantially in concurrently as would be appreciated.

After client agent 150 has transmitted all requested backup data to server 102, client agent 150 may wait for a confirmation from server 102 in a decisional operation 612. When client agent 150 does not receive such a confirmation, client agent 150 may re-collect backup data at operation 612, and retransmit such information in operation 614. In some implementations, client agent 150 may store disk recovery data 170 in a local repository, which may be known by server 102 and polled upon occurrence of a predetermined event, in which case transmit and confirmation operations 610 and 614-616 may be performed when the predetermined events occur. When disk recovery data 170 and/or backup data 175 have been suitably stored and/or identified by server 102, a thread associated with client agent 150 may be terminated in an operation 618.

Referring to FIG. 7, an exemplary method 700 is illustrated for restoring a failed hard drive according to various aspects of the invention. Method 700 may reflect operational aspects of recovery media 140, which may occur upon insertion or other use with client 104 (e.g., when the recovery environment and/or recovery module launch, thereby initiating disk recovery). Nonetheless, the invention contemplates using any appropriate combination and arrangement of logical elements implementing some or all of the described functionality.

Method 700 may begin in an operation 702, when a first hard drive 160 associated with client 104 may be identified. Subsequently, a master boot record of identified hard drive 160 may be wiped, or otherwise eliminated, in an operation 704. The master boot record may typically be a first sector of a respective hard drive, as known to those skilled in the art. Next, in a decisional operation 706, it may be determined whether identified hard drive 160 is a boot drive associated with client 104, wherein a master boot record boot code may be written to hard drive 160 in an operation 708 when identified hard drive 160 is a boot drive. Subsequently, a disk marker (e.g., 0x55AA) may be written to a final two bytes of the first sector of identified hard drive 160 in an operation 710.

Next, a decisional operation 712 may include determining whether identified hard drive 160 is a dynamic disk. If not, processing proceeds to an operation 720, described in greater detail below. When identified hard drive 160 is a dynamic disk, a sixth sector and associated data may be identified on recovery media 140 in an operation 714, and such data may be written to a sixth sector of hard drive 160 in an operation 716. Furthermore, one or more parameters may be set for hard drive 160, such as setting a dynamic disk variable to 'True' in an operation 718. For a dynamic disk, processing then proceeds to an operation 724.

When hard drive 160 is not a dynamic disk, a decisional operation 720 may include determining whether hard drive 160 is a basic disk. If so, an operation 722 may include restoring partitions to hard drive 169 based on disk recovery data 170 stored in, or referenced by, media 140. Processing then proceeds to operation 724.

In operation 724, suitable processing and recovery for first identified hard drive 160 may be complete, and decisional operation 724 may include determining whether client 104 includes any additional hard drives 160 to be restored. If so, a next hard drive to restore may be identified in an operation 726, and processing may proceed to operation 704 to process recovery of the next identified hard drive.

When all hard drives 160 have been suitably processed and recovered, method 700 may proceed to an operation 728, which may include creating a handle to a mount point manager of an operating system. Once created, the mount point manager may be notified of new partitions existing on hard drive(s) 160 in an operation 730.

Subsequently, a decisional operation 732 may include determining whether the dynamic disk variable is set to 'True,' in which case client 104 may be rebooted in an operation 734. For non-dynamic hard drives, rebooting may be unnecessary, and processing may proceed directly to an operation 736.

Hard drive(s) 160 may then be ready for formatting, such that data can be written to drives 160. As such, an operation 736 may include formatting all partitions of hard drives 160 using any suitable formatting utility (e.g., a utility supplied by a conventional operating system, the recovery environment, etc.). An operation 738 may subsequently include restoring volume mount points, wherein hard drive(s) 160 may be ready for use. For example, backup data 175 may be written to hard drive 160, and therefore, drive 160 may be restored to an operational, functional, pre-failure state.

Implementations of the invention may be made in hardware, firmware, software, or any combination thereof. The invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable storage medium may include read only memory, random access memory, magnetic disk storage media, optical storage media, flash memory devices, and others, and a machine-readable transmission media may include forms of propagated signals, such as carrier waves, infrared signals, digital signals, and others. Further, firmware, software, routines, or instructions may be described in the above disclosure in terms of specific exemplary aspects and implementations of the invention, and performing certain actions. However, as is apparent, such descriptions are merely for convenience and that such actions in fact result from computing devices, processors, controllers, or other devices executing the firmware, software, routines, or instructions.

Aspects and implementations may be described as including a particular feature, structure, or characteristic, but every aspect or implementation may not necessarily include the particular feature, structure, or characteristic. Further, when a particular feature, structure, or characteristic is described in connection with an aspect or implementation, it is understood that, as would be apparent, such feature, structure, or characteristic may be effected in connection with other aspects or implementations whether or not explicitly described. Thus, various changes and modifications may be made, without departing from the scope and spirit of the invention. The specification and drawings are to be regarded as exemplary only, and the scope of the invention is to be determined solely by the appended claims.

What is claimed is:

1. A method for restoring a hard drive, comprising:
    collecting, configuration information from an operational hard drive coupled to a device, wherein the device has an associated boot mechanism; and creating a computer-readable recovery media having a bootable recover environment recorded thereon, where in response to failure of the operational hard drive, the recovery environment is operable to:
  configure a restoration hard drive coupled to the device using the collected configuration information, wherein the Operational hard drive and the restoration hard drive are dynamic disks;
  boot the device without using the boot mechanism associated with the device;
identify dynamic disk data associated with the operational hard drive using the collected configuration information, wherein the identified dynamic disk data is associated with a disk region;
  write the identified dynamic disk data to the disk region of the restoration hard drive; and
  set a flag associated with the restoration hard drive to indicate that the restoration hard drive is a dynamic disk, wherein the recovery environment runs on the device without using any hard drive associated with the device.

2. The method of claim 1, wherein the configuration information includes host level settings, the host level settings including at least one of a host name, an operating system version, or a total number of hard drives associated with the device.

3. The method of claim 1, wherein the configuration information includes disk level settings, the disk level settings including at least one of a disk adapter name, a number of bytes per sector, a number of sectors per track a number of tracks per cylinder, a total number of cylinders, a total disk size, a disk identification number, a disk signature, a vendor name, a dynamic disk flag, a cluster disk flag, a total amount of free space, or a total number of partitions associated with the operational hard drive.

4. The method of claim 1, wherein the configuration information includes partition level settings, the partition level settings including at least one of a boot indicator, a partition identification number, a starting offset, a total length, or a partition type associated with a partition of the operational hard drive.

5. The method of claim 1, wherein the configuration information includes file system level settings, the file system level settings including at least one of a drive letter, a file system name, a total amount of space, a total amount of free space, a globally unique identifier for a volume, a label for the volume, a file system attribute, or a mount point associated with a file system of the operational hard drive.

6. the method of claim 1, the recovery environment further operable to wipe a master boot record from the restoration hard drive and write a disk marker to the restoration hard drive.

7. The method of claim 6, wherein writing the disk marker includes writing 0x55AA to a final two bytes of a first sector of the restoration hard drive.

8. The method of claim 1, the recovery environment further operable to write a master boot record to the restoration hard drive if the restoration hard drive is a boot drive.

9. The method of claim 1, wherein the disk region includes one or more of a sixth sector or a final megabyte of a hard drive.

10. The method of claim 1, wherein the operational hard drive and the restoration hard drive are basic disks, the recovery environment further operable to:
  identify at least one partition associated with the operational hard drive using the collected configuration information; and
  create the at least one partition on the restoration hard drive.

11. The method of claim 1, the recovery environment further operable to:
  create a handle to an operating system mount point manager, wherein the handle is used to notify the mount point manager of new partitions associated with the restoration hard drive;
  format the new partitions associated. with the restoration hard drive using the collected configuration information; and
  restore volume mount points associated with the restoration hard drive using the collected configuration information.

12. A method for restoring a hard drive, the method comprising:
  collecting configuration information from an operational hard drive; and
  creating a computer-readable recovery media having a bootable recovery environment recorded thereon, wherein the recovery environment is operable to:
    transfer the collected configuration information to a restoration hard drive coupled to a device, wherein the device has an associated boot mechanism;
    configure the restoration hard drive coupled to the device using the collected configuration information wherein the operational hard drive and the restoration hard drive are dynamic disks;
    boot the device without using the boot mechanism associated with the device;
    identify dynamic disk data associated with the operational hard drive using the collected configuration information, wherein the identified dynamic disk data is associated with a disk region;
    write the identified dynamic disk data to the disk region of the restoration hard drive; and
    set a flag associated with the restoration hard drive to indicate that the restoration hard drive is a dynamic disk, wherein the recovery environment runs on the device without using any hard drive associated with the device.

13. A system for restoring a hard drive, comprising:
  a client device having an associated boot mechanism, wherein at least one operational hard drive is coupled to the client device;
  at least one data repository storing configuration information collected from the operational hard drive coupled to the client device; and
  at least one media creation device configured to create a computer-readable recovery media having a bootable recovery environment recorded thereon, wherein in response to failure of the operational hard drive, the recovery environment is operable to:
    configure a restoration hard drive coupled to the client device using the stored configuration information, wherein the operational hard drive and the restoration hard drive are dynamic disks;
    boot the client device without using the boot mechanism associated with the client device;
    identify dynamic disk data associated with the operational hard drive using the configuration information, wherein the identified dynamic disk data is associated with a disk region;
    write the identified dynamic disk data to the disk region of the restoration hard drive; and
    set a flag associated with the restoration hard drive to indicate that the restoration hard drive is a dynamic disk, wherein the recovery environment runs on the client device without using an hard drive associated with the client device.

14. The system of claim 13, wherein the configuration information includes host level settings, the host level settings including at least one of a host name, an operating system version, or a total number of hard drives associated with the client device.

15. The system of claim 13, wherein the configuration information includes disk level settings, the disk level settings including at least one of a disk adapter name, a number of bytes per sector, a number of sectors per track, a number of tracks per cylinder, a total number of cylinders, a total disk size, a disk identification number, a disk signature, a vendor name, a dynamic disk flag, a cluster disk flag, a total amount of free space, or a total number of partitions associated with the operational hard drive.

16. The system of claim 13, wherein the configuration information includes partition level settings, the partition level settings including at least one of a boot indicator, a partition identification number, a starting offset, a total length, or a partition type associated with a partition of the operational hard drive.

17. The system of claim 13, wherein the configuration information includes file system level settings, the file system level settings including at least one of a drive letter, a file system name, a total amount of space, a total amount of free space, a globally unique identifier for a volume, a label for the volume, a file system attribute, or a mount point associated with a file system of the operational hard drive.

18. The system of claim 13, the recovery environment further operable to wipe a master boot record from the restoration hard drive and write a disk marker to the restoration hard drive.

19. The system of claim 18, wherein writing the disk marker includes writing 0x55AA to a final two bytes of a first sector of the restoration hard drive.

20. The system of claim 13, the recovery environment further operable to write a master boot record to the restoration hard drive if the restoration hard drive is a boot drive.

21. The system of claim 13, wherein the disk region includes one or more of a sixth sector or a final megabyte of a hard drive.

22. The system of claim 13, wherein the operational hard drive and the restoration hard drive are basic disks, the recovery environment further operable to:
 identify at least one partition associated with the operational hard drive using the collected configuration information; and
 create the at least one partition on the restoration hard drive.

23. The system of claim 13, the recovery environment further operable to:
 create a handle to an operating system mount point manager, wherein the handle is used to notify the mount point manager of new partitions associated with the restoration hard drive;
 format the new partitions associated with the restoration hard drive using the collected configuration information; and
 restore volume mount points associated with the restoration hard drive using the collected configuration information.

24. A system for restoring a hard drive, the system comprising:
 at least one data, repository storing configuration information collected from an operational hard drive; and
 at least one media creation device configured to create a computer-readable recovery media having a bootable recovery environment recorded thereon, wherein the recovery environment is operable to:
  transfer the stored configuration information to a restoration hard drive coupled to a client device, wherein the client device has an associated boot mechanism;
  configure the restoration hard drive coupled to the client device using the stored configuration information, wherein the operational hard drive and the restoration hard drive are dynamic disks;
  boot the client device without using the boot mechanism associated with the client device;
  identify dynamic disk data associated with the operational hard drive using the configuration information, wherein the identified dynamic disk data is associated with a disk region;
  write the identified dynamic disk data to the disk region of the restoration hard drive; and
  set a flag associated with the restoration hard drive to indicate that the restoration hard drive is a dynamic disk, wherein the recovery environment runs on the client device without using any hard drive associated with the client device.

25. A computer-readable medium for restoring an operational hard drive coupled to a device, wherein the device has an associated boot mechanism and wherein the computer-readable medium has a bootable recovery environment recorded thereon, where in response to failure of the operational hard drive, the bootable recovery environment is operable to:
 retrieve configuration information from the operational hard drive during an operational state of the operational hard drive;
 configure a restoration hard drive coupled to the device using the retrieved configuration information, wherein the operational hard drive and the restoration hard drive are dynamic disks;
 boot the device without using the boot mechanism associated with the device;
 identify dynamic disk data associated with the operational hard drive using the configuration information, wherein the identified dynamic disk data is associated with a disk region;
 write the identified dynamic disk data to the disk region of the restoration hard drive; and
 set a flag associated with the restoration hard drive to indicate that the restoration hard drive is a dynamic disk, wherein the recovery environment runs on the device without using an hard drive associated with the device.

26. The computer-readable medium of claim 25, wherein the configuration information includes host level settings, the host level settings including at least one of a host name, an operating system version, or a total number of hard drives associated with the device.

27. The computer-readable medium of claim 25, wherein the configuration information includes disk level settings, the disk level settings including at least one of a disk adapter name, a number of bytes per sector, a number of sectors per track, a number of tracks per cylinder, a total number of cylinders, a total disk size, a disk identification number, a disk signature, a vendor name, a dynamic disk flag, a cluster disk flag, a total amount of free space, or a total number of partitions associated with the operational hard drive.

28. The computer-readable medium of claim 25, wherein the configuration information includes partition level settings, the partition level settings including at least one of a boot indicator, a partition identification number, a starting offset, a total length, or a partition type associated with a partition of the operational hard drive.

29. The computer-readable medium of claim 25, wherein the configuration information includes file system level settings, the file system level settings including at least one of a drive letter, a file system name, a total amount of space, a total amount of free space, a globally unique identifier for a volume, a label for the volume, a file system attribute, or a mount point associated with a file system of the operational hard drive.

30. The computer-readable medium of claim 25, the recovery environment further operable to:
   wipe a master boot record from the restoration hard drive; and
   write a disk marker to the restoration hard drive.

31. The computer-readable medium of claim 30, wherein writing the disk marker includes writing 0x55AA to a final two bytes of a first sector of the restoration hard drive.

32. The computer-readable medium of claim 25, the recovery environment further operable to write a master boot record to the restoration hard drive if the restoration hard drive is a boot drive.

33. The computer-readable medium of claim 25, wherein the disk region includes one or more of a sixth sector or a final megabyte of a hard drive.

34. The computer-readable medium of claim 25, wherein the operational hard drive and the restoration hard drive are basic disks, the recovery environment further operable to:
   identify at least one partition associated with the operational hard drive using the collected configuration information; and
   create the at least one partition on the restoration hard drive.

35. The computer-readable medium of claim 25, the recovery environment further operable to:
   create a handle to an operating system mount point manager, wherein the handle is used to notify the mount point manager of new partitions associated with the restoration hard drive;
   format the new partitions associated with the restoration hard drive using the collected configuration information; and
   restore volume mount points associated with the restoration hard drive using the collected configuration information.

36. A computer-readable medium for restoring an operational hard drive coupled to a device, wherein the computer-readable medium has a bootable recovery environment recorded thereon, wherein the bootable recovery environment is operable to:
   retrieve configuration information from the operational hard drive during an operational state of the operational hard drive;
   transfer the configuration information to a restoration hard drive coupled to the device, wherein the device has an associated boot mechanism;
   configure the restoration hard drive coupled to the device using the configuration information, wherein the operational hard drive and the restoration hard drive are dynamic disks;
   boot the client device without using the boot mechanism associated with the client device;
   identify dynamic disk data associated with the operational hard drive using the configuration information, wherein the identified dynamic disk data is associated with a disk region;
   write the identified dynamic disk data to the disk region of the restoration hard drive; and
   set a flag associated with the restoration hard drive to indicate that the restoration hard drive is a dynamic disk, wherein the recovery environment runs on the device without using any hard drive associated with the device.

* * * * *